United States Patent [19]

Strickland

[11] Patent Number: 5,425,643

[45] Date of Patent: Jun. 20, 1995

[54] MECHANICAL, ANALOG TYPE, TEACHING AID COMPUTER

[76] Inventor: William A. Strickland, 1512 N. Pebble Beach Blvd., Sun City Center, Fla. 33573

[21] Appl. No.: 41,199

[22] Filed: Apr. 1, 1993

Related U.S. Application Data

[63] Continuation-in-part of Ser. No. 722,952, Jun. 28, 1991, abandoned.

[51] Int. Cl.$^6$ ............................................. G09B 19/02
[52] U.S. Cl. ..................................... 434/194; 434/202
[58] Field of Search ............... 434/194, 195, 191, 188, 434/202, 209

[56] References Cited

U.S. PATENT DOCUMENTS

| | | | |
|---|---|---|---|
| 3,001,114 | 9/1961 | Orlov | 434/194 |
| 3,928,923 | 12/1975 | Harte | 434/194 |
| 3,949,491 | 4/1976 | Harte | 434/194 |
| 4,106,220 | 8/1978 | Hurd | 434/194 |
| 4,713,009 | 12/1987 | Borenson | 434/188 |
| 4,731,022 | 3/1988 | Garland | 434/194 |

FOREIGN PATENT DOCUMENTS

| | | | |
|---|---|---|---|
| 0240574 | 10/1987 | European Pat. Off. | 434/194 |
| 1407899 | 10/1975 | United Kingdom | 434/194 |

*Primary Examiner*—Gene Mancene
*Assistant Examiner*—Jeffrey A. Smith

[57] ABSTRACT

A teaching aid computer, requiring no electrical or spring power, designed for elementary and middle school students, that when properly set and manipulated, provides real number solutions to equations involving multiple degree, as well as single degree unknowns. Parallel, interconnecting balancing beams are marked so as to provide adjustable positions for weights, whose resultant torques represent equation constants and coefficients of each degree of the unknown quantity. Further, by positioning and clamping movable axes beams, students can see and feel the results of adding or subtracting a few, or a series of numbers. Also, sliding beams, as well as sliding weights captively located in channels of each beam, with no required extra loose weights, allow simple decimal settings and answers to equations involving multiplication, and division. Being non-electronic, the student can understand the simple, visable, teeter-tooter-like workability of the repeated mechanical advantages and torque transfers from beam to beam, prior to beam and equation balancing, with this computer; and so gain confidence in rapidly discovering an answer, and also a range of non-answers, to a third degree equation, for example.

6 Claims, 7 Drawing Sheets

$$T = \Pi\theta ER^4/2L \quad \text{———} \quad 43$$
$$\frac{T2L}{\Pi\theta E} = 10.49 = R^4 \quad \text{———} \quad 44$$
$$R^4 - 10.49 = 0 \quad \text{———} \quad 45$$
$$R = 1.8 \quad \text{———} \quad 46$$

*FIGURE 4*

$-2X^4 - 5X^3 + 10X^2 - 4X + 16 = 0$ —— 47
$X = -4$ as indicated at balance —— 48

FIGURE 5

$$V = 4/3\pi R^3 \quad\text{———— 49}$$
$$14.04 = .52D^3 \quad\text{———— 50}$$
$$D^3 - 27 = 0 \quad\text{———— 51}$$
D = 3 as indicated at balance ———— 52

MECHANICAL, ANALOG TYPE, TEACHING AID COMPUTER

CROSS REFERENCE APPLICATION

This is a continuation in part of Ser. No. 07/722,952, filed Jun. 28, 1991, now abandoned.

BACKGROUND OF THE INVENTION

1. Field of the Invention

This invention is categorized as an educational aid for students of mathematics, The construction and operation of this teaching aid can help elementary and middle grade students understand equations involving addition, subtraction, multiplication, division, and multiple as well as single degree unknowns.

2. Description and Relationship of Prior Art

U.S. Pat. No. 3,788,541 also covers a mechanical computer. However the goal of U.S. Pat. No. 3,788,541 is to provide accuracies similar to those achieved by a very large slide rule. By utilizing reels of tape, instead of rule length, U.S. Pat. No. 3,788,541's approach remains compact in size. The goals, construction, and utilization of the computer as described in this application are completely different from referenced U.S. Pat. No. 3,788,541.

U.S. Pat. Nos. 3,949,491, 3,928,923, 4,106,220, 4,713,009, 4,731,022, and European Patent EP - 240-574-A, and British Patent 1,407,899, all involve single balancing beam teaching aid apparatus to help young students with solutions to equations involving only single degree unknowns, such as $2+X=7$; $3N=18$; $2X+(-X)+3=2(-X)+15$; and $27/3=R$. U.S. Pat. No. 3,000,114 involves multiple balancing beams, but with no facility for changing a lever arm length on either side of any beam. It follows that U.S. Pat. No. 3,000,114 does not indicate the ability to solve any multiple degree equations.

Equations having multiple degree unknowns have very important and widespread use throughout science and industry, Examples are included later that involve:

(a) a 4th degree equation for finding the radius of a rod having a given twisting torque T, shear modulus E, and length L—as used extensively in the automotive industry;

(b) a 3rd degree equation for finding the radius of a sphere—a soft ball—when knowing the ball's volume;

(c) a 2nd degree equation for finding the direct current in an automobile light bulb when knowing its resistance and its wattage rating.

A separate list includes some common multiple degree equations.

Studies have shown that young students are capable of learning concepts involved with equations having multiple degree unknowns. However, there is no manipulating type of mechanical computer teaching aid that will help in understanding and solving a multiple degree equation such as $-2X^4-5X^3+10X^2-4X+16=0$. Later in this application, an example of the simple set up and solution of such a 4th degree equation is illustrated. This invention's teaching aid will reinforce the students' understanding and memory of the equation solution process, in addition to discovering problem solutions.

Figure 1:
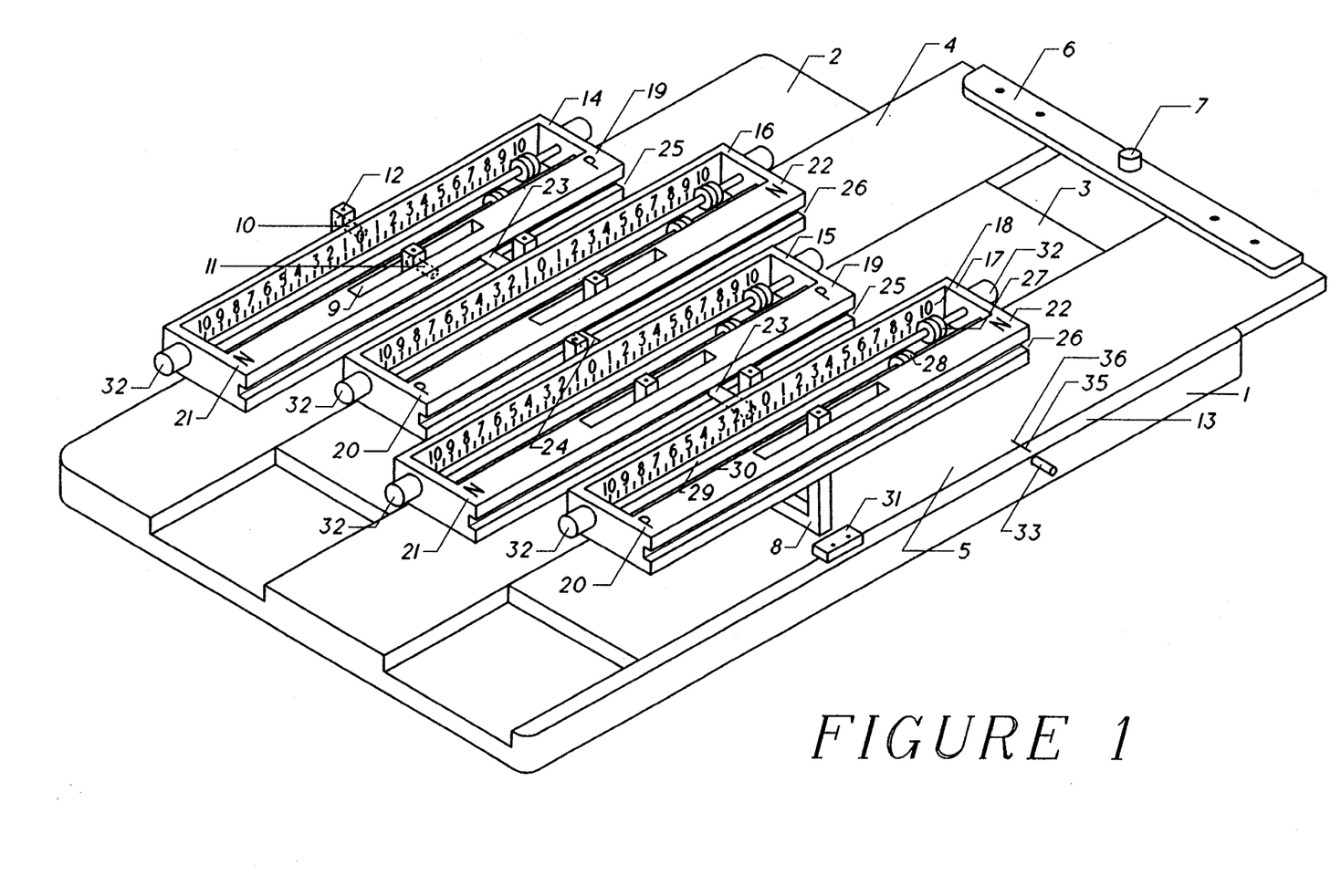
FIG. 1 shows a proposed complete teaching aid computer assembly with four beams as needed to solve a third degree equation.
Figure 2:
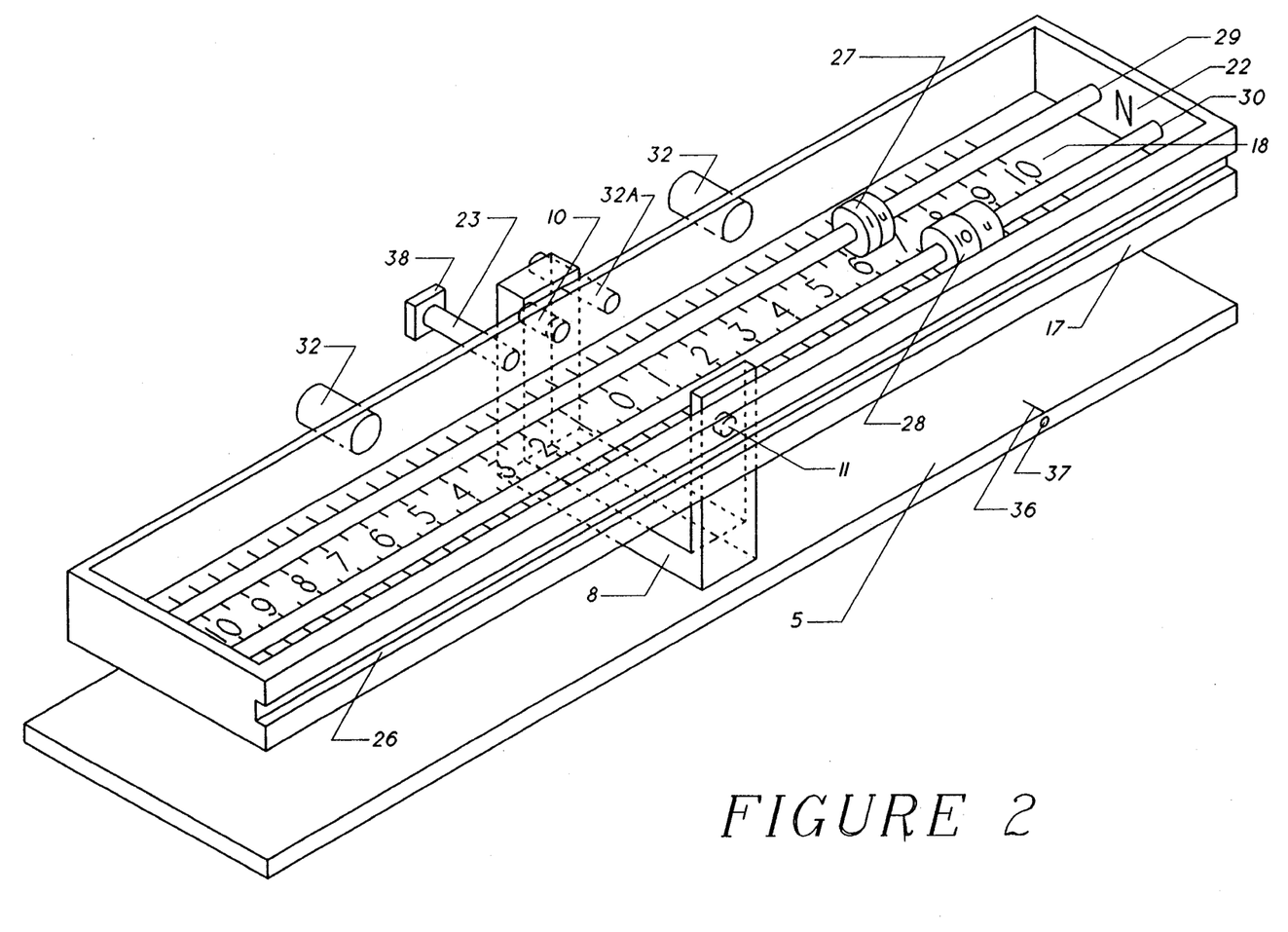
FIG. 2 illustrates a closeup of either a moving or stationary mounting strap and axis, beam (17 or 15).

Since all of the referenced patents involve only a single balance beam, it will be revealed by a comparison to representative patent '491, FIGS. 4, 6, and 8, versus this application's FIGS. 1 and 2, that in order for '491 to arrive at a total weight, shown as 44, at a specific beam lever arm, shown as $-6$ in FIG. 6, or $-8$ in FIG. 8, several component weights must first be added mentally, then stacked correctly, before a desired confirmation, as in FIG. 8, that $8\times3=24$. With this application's approach, by comparison, it is easier, faster, and has less likelihood of error, to slide a 1 unit weight to a $+4$ position on a second beam, than to stack four 1 unit weights at a number 1 position on a single beam.

The stacking of weights, involved with the referenced patents' single beams, could raise the grouped weights' center of gravity too high for a proper, narrow band, accurate, beam balancing movement.

All of the referenced patents are limited in that whenever their single beam is used for solutions to multiplication or division problems, at least one stacked weight, or substitution weight is required, along with its disadvantages.

Only this application's multiple interconnecting beam approach overcomes the stated disadvantages or limitations with stacking or substituting weights: (a) increased required time; (b), higher weight center of gravity, and (c), likelihood of error.

Further, here, by using a group of interconnecting balancing beams, with each beam having at least a 1 unit and 10 unit weight, along with decimal marked positions for settings; the decimal system can be taught and used, A large part of a student's attraction to, and confidence in, a teaching aid computer stems from an understanding of how it works, Today's popular teaching aid computers have complex electronic circuitry that is seldom understood by the user. Therefore, the student most often must proceed on blind faith the computer's capability. If an error occurs, the student can only check his programming, not the way that program is processed through the computer's circuitry. This application's teaching aid computer has exposed workability that is easily understood and therefore bolsters confidence and attraction in its use.

Later, FIGS. 3 through 7, are directed to an understanding of the computer's workability as well as its use in problem solution.

SUMMARY OF THE INVENTION

Objects of this invention are to provide:

(a) a mechanical, analog type, teaching aid computer—free of any required electrical, or mechanical spring, power source;

(b) a computer that requires a sense of manipulative touch, as well as a sense of balance—motor nerve inputs to student's brain that bolster understanding and memory;

(c) a computer that allows solutions to multiple degree, as well as single degree, equations;

(d) a computer that allows a student to use one or more sliding weights, and/or placable torques or forces provided by one or more adjacent moving axis beams, to achieve solution to equations involving addition, subtraction, division, and single and multiple degree unknowns;

(e) a computer with more than two connectable beams and with multiple weight channels, that may be needed accomplishing solutions to addition and subtraction problems involving many numbers—by locking connected moveable beam mounting strips in positions so that all beam weight channels can be used;

(f) a computer that allows a student to observe a range of non-answers, as well as one or more answers, to single and multiple degree equations;

(g) a computer whose workability can be easily seen and understood. The basic concept of balancing torques is gained by a child early on. A heavy child automatically sits closer to the fulcrum of a teeter-toter to offset the torque of a lighter child that sits further back from the fulcrum. Thus, a student may be attracted to the use of this teaching aid because of his or her confidence in understanding the computer's basic functions.

(h) a computer composed of a group of interconnecting balancing beams that only requires understandable settings and manipulative balancing. Such activity should challenge and intrigue young students with their sense of accomplishment having an ability to solve otherwise too-complex problems—the type of multiple degree problems that are involved with equations similar to ones that one of their relatives or acquaintances may utilize at work. Thus, the young student may be viewed by elders with astonishment and accompaning praise. What better motivation would there be to encourage our country's hoped for, forthcoming generation of scientists and engineers.

In achieving the above objects, this invention utilizes a cross combing effect of two sets of parallel, equally spaced, interconnected, alternately stationary and moveable axes mounted, balancing beams—to seek real number solutions to single or multiple degree equations that have been arranged to have both sides equal to zero.

Each beam has a torque transfer shaft on its left side, at its numbered 1 position. Marks are made and numbered at an equal spacing of positions from 1 to 10 starting from its centered pivoting axis toward each outside. Each of those marked spaces are further subdivided and marked into 10 equal spaces, with marked sub numbers 1 to 9 arranged in succession from each inboard to outboard position. Alternate beams have stationary and movable axes. Each beam has a designated positive and negative half of its length on either side of its 0 marked pivoting axes. The stationary axes beams have common positive sides, which are at opposite ends to the common positive sides of the movable axes beams. Each beam has a depth centered, linear groove along its length, on its right side. Each beam's torque transfer shaft's end mounted rotatable block shaped bearing mates and slides snugly within its adjacent beam's groove.

The movable axis beams' supports are fastened, and move in unison, so that the distance marked space between each torque transfer shaft and the pivoting axis of the groove engaged beam, is always the same from beam to beam. Therefore, that common distance is utilized as the unknown in a multiple degree equation which has each side set to equal 0. Setting an equation whose both sides equal zero, allows a state of balance of beams when an equation solution is indicated.

Each beam includes a 1 unit and a 10 unit weight that can be placed and held in any position along the beam's length. Beams from left to right can be designated a,b,c,d and e for simple identification. The weights on beam "a" are placed to produce torque that represents the + or − constant in an equation. Weights on beam "b" are placed to produce torque that represents the + or − coefficient of the first degree of the unknown. Beam "c" weights are placed to produce torque that represents the coefficient of the 2nd degree of the unknown. Beam "d" weights are placed to produce torque that represents the coefficient of the 3rd degree of the unknown. Beam "e" weights are placed to produce torque that represents the coefficient of the 4th degree of the unknown. Each additional added beam allows solution of an equation with one higher degree of the unknown.

After the constants and coefficients of the equation are set as above, the movable axes beams, being fastened together, are moved in unison from an extreme left to right hand end of the computer while noting any indicated position at which the beams tip back and forth. The positioning of the movable beams is then adjusted until all beams balance and the torque transfer shafts point to the answer.

BRIEF DESCRIPTION OF DRAWINGS

FIGS. 3, 4, 5, 6, and 7 schematically use an open circle to represent the location of a ten unit weight and a smaller solid circle to represent the location of a one unit weight, for each beam, when illustrating a problem solution method.

DESCRIPTION OF THE PREFERRED EMBODIMENT

The following is a list of items as numbered in FIGS. 1 through 7, with an accompanying brief description.

| Item No. | Description |
| --- | --- |
| 1 | Rectangular base of the teaching aid computer |
| 2 | Left hand stationary mounting strip |
| 3 | Right hand stationary mounting strip |
| 4 | Left hand, linearly moveable, mounting strip |
| 5 | Right hand, linearly moveable, mounting strip |

The listed items 2, 3, 4, and 5, mounting strips are all stiff, rectangular, parallel, and have the same, width, and depth. The two stationary strips 2, and 3 are fixed to base 1, have the same length, and have their ends in alignment. The two moving strips 4 and 5 have the same length, and have their ends maintained in alignment. The stationary strips prevent any lateral movement of the moveable strips, and guide their

-continued longitudinal movement.

6    A crossbar fixed to the same, right, ends of both strips 4 and 5. A similar bar can be fixed to their left ends.

7    A knob fixed to crossbar 6 which when moved, causes both moveable strips 4 and 5 to always move linearly, in unison.

8    A typical yoke shaped beam support, shown with a typical mounting on strip 5, and having two parallel uprights.

9    A typical cutout allowing protrusion of the right hand upright of a typical yoke support 8.

10   A typical left hand axle shaft.

11   A typical right hand axle shaft.

12   A typical top inserted pin in an upright, used to engage, and prevent lateral movement of, shaft 10. Similar pins prevent lateral movement of later described shafts. Typical beam insertable antifriction bearings, unshown, surrounding the ends of shafts 10 and 11 that are not pined 13   Right hand, narrow width, stationary strip of the same length and depth as stationary strips 2 and 3. These three stationary strips are utilized as guides for the parallel movement of the movable strips.

The above items 8 through 13 all are typical components used to pivotally mount the following balancing beams on their pictured strip bases.

14   Left hand (stationary axes) balancing beam that has typical inserted antifriction bearings, unshown, that mate with shafts 10 and 11 which are pinned to a yoke, like 8, which, in turn, is mounted on strip 2. Thereby, beam 14 is pivotally mounted on stationary strip 2.

15   Right hand, stationary axes, balancing beam pivotally mounted on stationary strip 2.

16   Left hand, movable axes, balancing beam pivotally mounted on movable strip 4.

17   Right hand, movable axes, balancing beam pivotally mounted on movable strip 5.

18   Evenly marked and numbered spaces, from the 0, centered position adjacent to the pivoting axes, to a numbered 10 position near each outside end of each beam. Unshown on FIGS. 1 and 2, because of anticipated crowding, are the 10 equal spaces with sub marks, between each of the main numbered positions. Typical marks, and sub marks, are shown later, in FIG. 4. Each beam is to be similarly marked with main, and sub marks.

19   A capital letter P, and (unshown) purple dye, indication of the assigned positive ends of stationary axes beam 2 and 3.

20   A capital letter P, and (unshown) purple dye indication of the assigned positive ends of movable axes beam 4 and 5. (opposite the ends of the stationary axes beams)

21   A capital letter N, and (unshown) nut brown indication of the assigned negative ends of stationary axes beams 2 and 3.

22   A capital letter N, and (unshown) nut brown indication of the assigned negative ends of movable axes beams 4 and 5.

23   A separate torque transfer shaft fixed perpendicularly to the middle of the left side, at the numbered 1, positive end, position of stationary axes beams 14 and 15.

24   A separate torque transfer shaft fixed perpendicularly to the middle of the left side, at the numbered 1, positive end, position of movable axes beams 16 and 17.

25   A separate groove along the length, at the middle of the right side, of the stationary axes beams 14 and 15.

26   A separate groove along the length, at the middle of the right side of the movable axes beams 16 and 17.

27   A typical 1 unit weight with its centered position placement mark.

28   A typical 10 unit weight with its centered position placement mark.

29   A typical shaft along the length of each beam on which a typical 1 unit weight 27 can slide with sufficient snugness to hold the weight in its placed position.

30   A typical shaft along the length of each beam on which a typical 10 unit weight 28 can slide with sufficient snugness to hold the weight in its placed position.

31   A block, fixed to strip 13, that confines strip 5 to horizontal, not vertical, movement. A similar block confines the left side of strip 4 to horizontal movement only.

32   typical balance weights applied during each beam's assembly, that cause each beam to remain in any set angular position, when the supporting axes are in a preassembly horizontal position, and the 1 unit and 10 unit weights are kept in their centered, 0 position.

32A  Shown with dashed lines as hidden is a short counter-

-continued balancing shaft weight fixed to the far side of typical fixed axis beam 15 or typical moveable axis beam 17; shown at the same depth, and symetrically placed opposite pin 23 with respect to colinear axes 10 and 11 as indicated in FIG. 2; shaft weight 32A counterbalances pin 23 and its bearing 38. Pin 23 and shaft 32A are as pictured for moveable axis beams 16 and 17, but are positioned in reverse for stationary axis beams 14 and 15. Pin 23 (as with pin 24) is always located on the "P" (positive) end of a beam.

33   A pin that can be fully inserted horizontally through end strip 31 into the normally movable strip 5 when torque transfer shafts 23 of movable axes beams 16 and 17 point to the positive end numbered 1 positions. In this locked position the 1 unit and 10 unit weights can represent numbers in problems involving addition and subtraction only.

34   Block, similar to 31, fixed on strip 2 and used to hold down the left out side of moveble strip 4. That block 34 is shown in its position in the later FIG. 3

The ends of cross bar 6 are sufficiently recessed to avoid interference with hold down blocks 31 and 34.

SOME CONSTRUCTION SPECIFICATIONS (Item Descriptions Resume Later)

Figure 3:
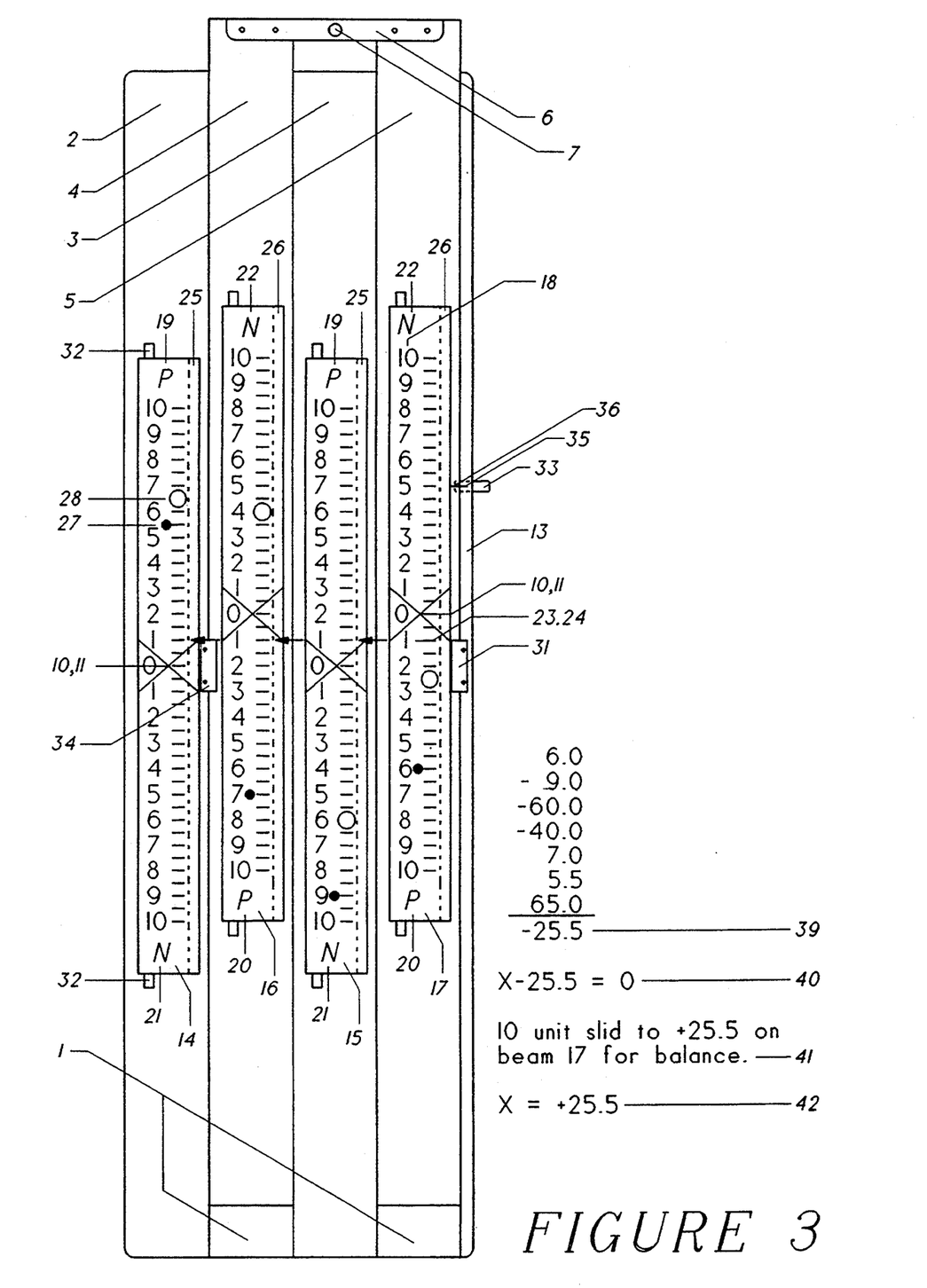
FIG. 3 is a schematic drawing representation of a method of fixing the moving strap base and axis beams with a locking pin (33).
Figure 4:
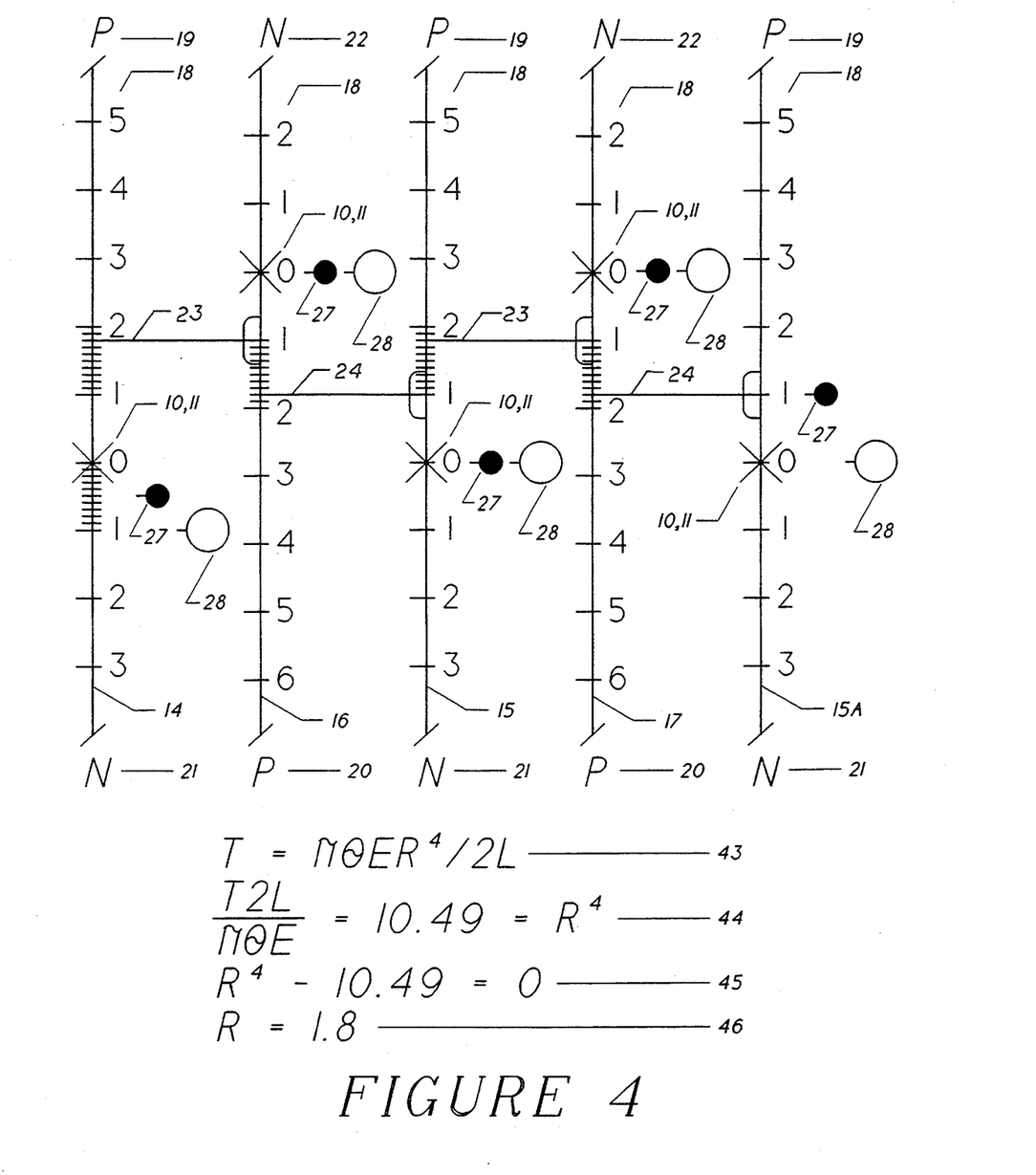
FIG. 4 is a schematic drawing that illustrates the placement of weights that can be used when solving a typical fourth degree equation for determining the radius of a torsional rod.
Figure 5:
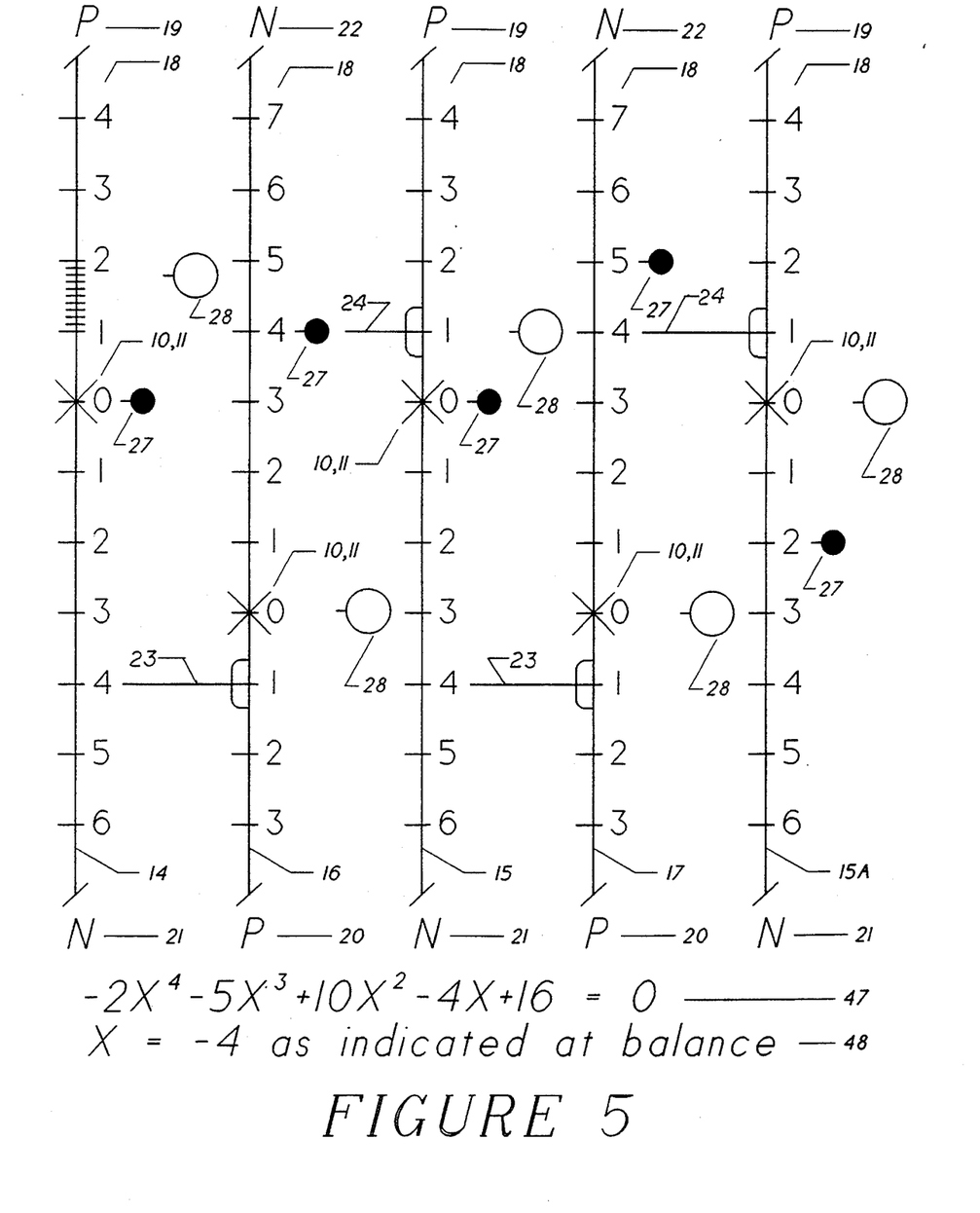
FIG. 5 is a schematic drawing that illustrates the placement of weights used in solving the fourth degree equation indicated.

(a) the movable axes beams all have the same axes centerline, (b) the stationary axes beams all have the same axes centerline, (c) the torque transfer shafts of the movable axes beams would have the same centerline when all beams are balanced, (d) the torque transfer shafts of the stationary axes beams would have the same centerline when all beams are balanced. More beams can be added to allow solution of equations involving 4th degree and higher unknowns. Five beams are shown in FIGS. 3 through 5, and in model that was used to prove the workability of this computer, (e) the center lines of all beam axes, and torque transfer shafts are always parallel, (When all of the beams are positioned parallel to base 1, a common plane parallel to base 1 would include: all beams' axes, all beams' torque transfer shafts, all beams' weights' centers of gravity, and the centerlines of the right side grooves on all beams.)

(f) the top surfaces of all beams would be in a second, separate common plane, parallel to the base, (g) the bottom surfaces of all beams would be in a third, separate, common plane parallel to the base, (h) all beams have the same length, width, and thickness, (i) stationary axes beams have the same ends designated as positive; the same ends designated as negative; and the same torque transfer shaft locations, (j) movable axes beams have the same ends designated as positives; the same ends designated as negative; and the same torque transfer shaft locations, (k) the moving axes beams have designated positive and negative half beam positions that are opposite to the stationary axes beam positions, (l) adjacent beams alternate between being the stationary, and the moving axes type.

As the moving axes beams' torque transfer shaft pointings are moved from positive numbered then to negative numbered sides of the adjacent stationary axes beams, real negative number solutions to equation unknowns can be revealed when the beams reach a balanced condition.

Further Item Descriptions

35    Index mark on stationary strip 13.
36    Index mark on movable strip 5 that lines up with mark 35 when the movable axes beams' torque transfer shafts point to positive 1 numbered locations on the stationary axes beams, at which position locking pin 33 can be inserted.

The following items apply to FIG. 2.

34    A block, previously mentioned, similar to block 31, that restrains the left side of the combined, movable, item 4 and 5, to linear, horizontal, not vertical, movement.
37    Bore in movable strip 5 and stationary strip 13 into which pin 33 has a snug fit when marks 35 and 36 are aligned..
38    Typical block shaped bearing that pivots on the extended end of all torque transfer shafts and slides snugly in the mating grooves like 25 or 26.

The following items apply to FIG. 3.

The schematic representation, as described below for items 10, 11, 23, 24, 27, and 28 apply to all FIGS. 3 through 7.

10 and 11    axles are represented schematically by a set of two, crossed lines, with a small 0 to the left of center, as each beam's pivoting axes.

23 and 24    torque transfer shafts are shown as a solid line projecting from the left, positive numbered 1 position from both the stationary and moving axes type beams, to engage in the groove of the adjacent beam to the left.

27    the 1 unit weight is represented schematically by a small circle with a darkened center.
28    the 10 unit weight is represented by a larger circle than 27, with an open center.
39    The sum of the listed numbers as added.
40    This balance beam teaching aid requires that all problems involving addition, subtraction, multiplication, division, and single and multiple degree equations, utilize an equation such as this equaling 0. When the beams (including the left hand stationary beam on which all torques are summed) are in balance, there is zero unbalanced CW or CCW torque.
41    Manipulative action needed to achieve equation 40 solution.
42    This is the teaching aid answer to the addition of the seven positive and negative numbers listed, with the 1 unit and 10 unit weights associated with each beam positioned in the correct places to represent the numbers to be added, and with all beams shown in their balanced positions. This answer is also confirmed as checked by the numbers summed at item 39.

The following item numbers occur in FIG. 4.

Note that the schematic representations, as decribed above, for the 1 unit and 10 unit weights, are shown to the right of each scale that represents one of the five separate beams, as labeled.

43    This is an equation that indicates the twisting torque on a rod having shear modulus E, length L, and radius R. The automotive industry, for example, has used torque rods to spring up trunk and hood lids, as well as give spring support to front axles of cars.
44    If the required spring torque is known, and the radius of the rod is desired, this equation applies.
45    To find the radius using this computer, this equation applies when beams are in balance.
46    The radius answer that becomes evident with the constants as inserted in 44 above and with the beams, as pictured, in their balanced state.
In further detail: (a) a 1 unit weight is placed in the +1 position on the added, stationary beam 15A - to represent the coefficient 1 for $X^4$. Since there are no $X^3$, $X^2$, or X quantities in the equation 45, no coefficients need to be set on beams 17, 15, or 16. The constant −10.49 is set on beam 14 with the 10 unit weight set at −1, and the 1 unit weight set at −.49. The movable axes beams 16 and 17 are then moved in unison by knob 7 through tie bar 6 until the beams rock back and forth on each side of the position when all torque transfer shaft point to +1.8. Then final balance of all beams occurs at +1.8. The most detailed description of the workability of this computer is given for the 4th degree equation associated with FIG. 5.

The following items apply to FIG. 5.

-continued

47    A typical 4th degree equation that requires, as does FIG. 4, the addition of stationary beam 15A for solution.
48    The computer's answer to equation 47.

Figure 6:
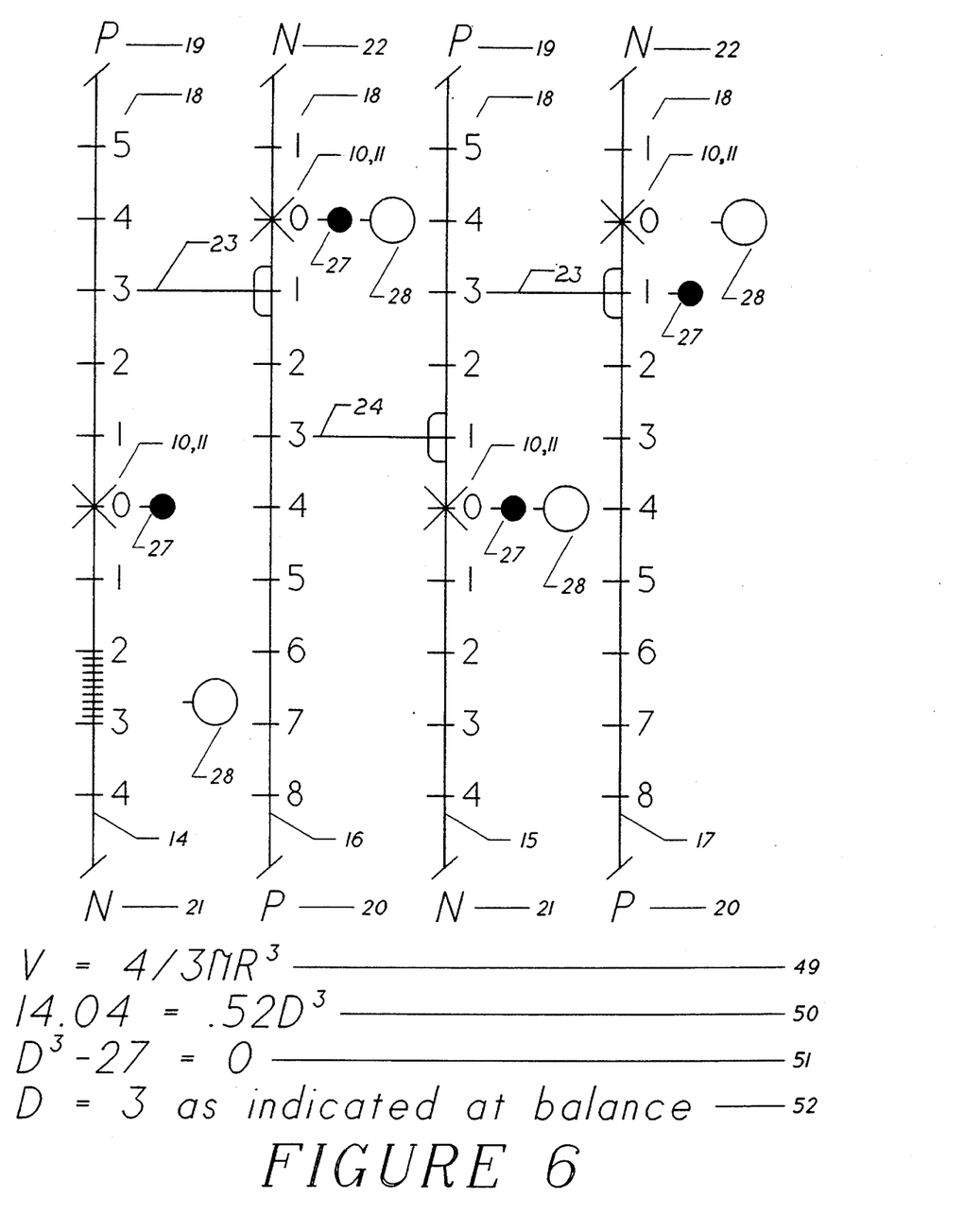
FIG. 6 is a schematic drawing of the placement of weights used in solving a third degree equation when seeking the diameter of a sphere when the volume is known.
Figure 7:
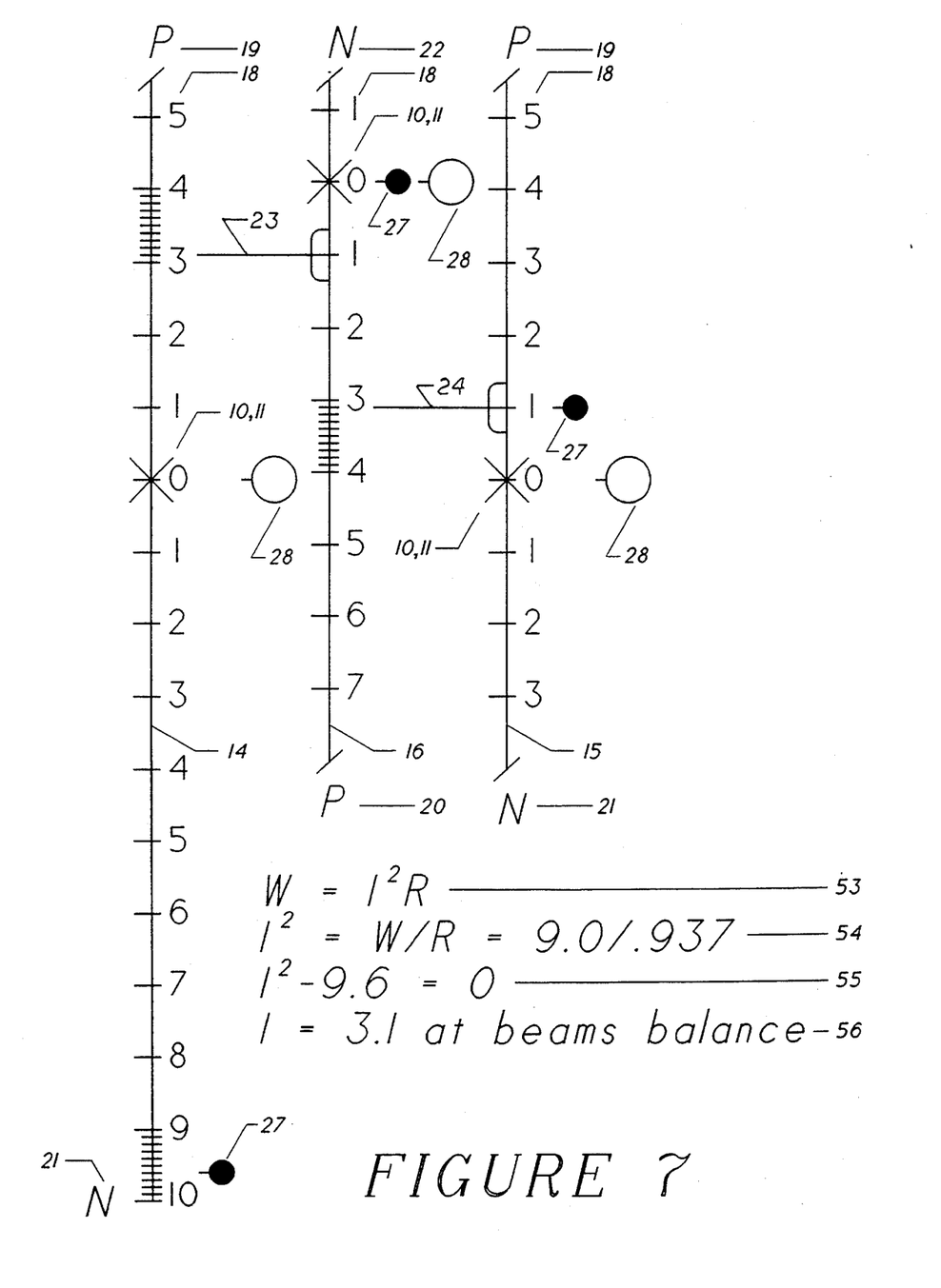
FIG. 7 is a schematic drawing of the required placement of weights for solution of a second degree equation for finding the electrical current when a light bulb's wattage and resistance are known.

The following shorthand will be employed for reviewing the settings for FIGS. 5 through 7.
B15A = beam 15A; W1 = weight 1 unit; N2 = negative side 2 W10 = weight 10 units; P0, or N0 = 0, occurs at the pivoting axes.
So, the settings for FIG. 5, equation 47 are: B15A,W1N2, W10P0; B17,W1N5,W10P0; B15W1P0,W10P1; B16,W1N4, W10P0; B14,W1P0,W10P1.6

Following the above settings, movable axis beams 16 and 17 are moved in unison until the beams rock back and forth on either side of the −4 (or N4) positions indicated by all of the torque transfer shafts. Then beams are balanced at −4. Therefore a real number solution to equation 47 is $X=-4$.

A further view to understand the workability of the computer in solving for the unknown in equation 47, as illustrated in FIG. 5, follows.

There is a 4 to 1 lever arm mechanical advantage repeated four times, using beams 17,15,16, and 14, caused by the moving beams' placement of the torque transfer shafts at −4. Therefore the −2 CCW, negative torque placed on beam 15A is multiplied by −4 four times. Thus producing −512 units of CCW, negatives torque on beam 14 around its 0 axis.

In a similar manner there is a 4 to 1 mechanical advantage repeated three times, using beams 15, 16, and 14, again caused by the moving beams' placement of the torque transfer shafts at the −4 position. The −5 units of torque caused by the 1 unit weight placed at the −5 positions is multiplied by −4 three times, and thus imposes +320 units of CW, positive torque around beam 14's 0 axis.

There is a 4 to 1 mechanical advantage repeated two times, using beams 16 and 14, again caused by the transfer shafts' placement at −4. The +10 units of torque caused by the 10 unit weight placed at the +1 position is multiplied by −4 two times and thus imposes +64 units of CW, positive torque around beam 14's 0 axis.

There is an additional effective single 4 to 1 mechanical advantage caused by the beam 16's transfer shaft's placement at −4 on beam 14. The −4 units of torque caused by the 1 unit of weight set at the −4 position on beam 16 is thereby multiplied by −4, by the beam 16's shaft applying a force at the −4 position on beam 14. That action imposes +16 units of CW, positive torque around beam 14's 0 axis.

The +16 setting of the constant of the equation is caused by the placement of a 10 unit weight at the +1.6 position on beam 14. Thereby imposing +16 units of CW torque around beam 14's 0 axis.

The summation of the above torques around beam 14's 0 axis includes: −512 CCW, +320 CW, +160 CW, +16 CW, +16 CW or a combined −512 CCW and +512 CW torques or a resultant zero torque. Thus, confirming a beam balance condition when all of the torque transfer shafts point to the −4 solution to the equation.

The following items apply to FIG. 6

49    The equation for determining the volume of a sphere having a radius R.
50    The equation for determining a sphere's diameter when its volume is known.
51    Equation 50 rearranged for use with this computer.

-continued

| | |
|---|---|
| 52 | This computer's indicated answer. |

The above described shorthand is used for making settings for the item 51 equation, as follows:

B17, W1P1, W10P0; B15, W1P0,W10P0; B16, W1P0, W10P0
B14, W1P0, W10N2.7

Beams 16 and 17 are then slid in unison within their tracks until the beams rock back and forth on opposite sides of P3. Then all beams are balanced at P3 (or +3) a real number solution to equations 50, and 51.

The following items apply to FIG. 7.

| | |
|---|---|
| 53 | An equation that indicates the relationship between watts W, direct current I, and resistance R in an electrical circuit. Such a relationship would be used for example, to calculate the current drawn by an automobile's light bulb. |
| 54 | In this specific equation, the square of the current can be determined if the bulbs watts and resistance are known. |
| 55 | Equation 54 rearranged for use in this computer. |
| 56 | This computer's answer in amps of current. |

Since there are no equation unknowns higher than the 2nd degree, the weights W1 and W10 would be set to P0 if beams 17, and 15A were employed. So, beams 17, and 15A are not shown here for simplicity. Actually, this computer can always have mope power by utilizing one mope beam than the number representing the exponent of the highest degree used in a specific equation.

The following is a review of the required beam settings— with reference to equation 55:

B15, W1P1, W10P0, B16W1P0, W10P0, B14.
W1N9.6

Beam 16 is then slid in its track until all beams tip back and forth on opposite sides of a P3.1 (+3.1) position. Then the beams are balanced when the torque transfer shafts point to P 3.1, a real number answer to this useful 2nd degree equation.

A simple second degree equation, that also includes a first degree term is $2n^2 - 5n - 3 = 0$. This equation is solved in the following manner:

(a) slide a one unit weight to the number 3 marked position on the negative side of beam a;
(b) slide a one unit weight to the number 5 marked position on the negative side of beam b;
(c) slide a one unit weight to the number 2 marked position on the positive side of beam c;
(d) at a measured place, slide the combined beams b, and d, from a position where the stationary and moving axes are furthest apart, on one side, to the position where the beams are furthest apart on the opposite side;
(e) each beam will assume a slope in one direction, then in the opposite direction, on either side of an indicated answer +3, where each beam remains in a balanced condition. Thus, a student can learn a bracketing-in procedure to obtain the answer.
(f) the student may then pursue a normal procedure of substituting, a +3 in place of the unknown, to confirm a +3 answer.

FIG. 1 is a three dimensional drawing of a teaching aid computer having four beams. Thus, its represented capability is limited to a solution of 3rd degree equations as illustrated later, schematically, in FIG. 6.

Mounting strips 2, and 3, fixed to base 1, act as parallel side edge guides for movable beam mounting strips 4 and 5. The supporting yokes 8, and pivoting axles, 10, and 11 for all beams, as covered in the item descriptions above, are shown mounted perpendicularly to the length of each of their mounting strips, allowing all beams to rotate slightly, in parallel vertical planes.

The item 18 weight position marks and numbers are shown, with an increased number of divisions, where there is more room, for example in FIG. 6.

When each beam is separately assembled, and with the 1 unit weight 27, and the 10 unit weight 28 centered at the 0 position and with torque transfer shaft 23, (or 24) fixed in the numbered 1 assigned positive position (19, or 20) the balancing weights 32 are sized and positioned to permit each beam to remain at any one placed angle.

Bar 6 fixed to the ends of both longitudinally moving beam support strips 4 and 5 essentially creates one common moving platform, keeping the moving axes beams 16 and 17 in the same longitudinal position.

In a manner better than FIG. 1, FIGS. 3 through 7, with their schematic top views, illustrate mechanically, how an equation's unknown can be applied an exponent number of times as a repeated torque and summarized along with the effects of the equation's constants and coefficients as CW and CCW opposing torques applied to beam 14.

FIG. 2 shows a blown up portion of a typical moving axes beam 16, or 17—so identified because the torque transfer shaft 23 is at the opposite side to the negative mark 22.

Typical small bearing block 38, rotatably mounted on the outside end of torque transfer shaft 23, is sized to slide snugly within the longitudinal groove of the adjacent left hand stationary beam, such as 14, or 15. Block 38 provides a larger, hence more wear immune, bearing surface against the top and bottom surfaces of its mating groove.

FIG. 3 schematically illustrates how beams 4 and 5 can be held in their pictured position, with pin 33, when marks 35 and 36 line up. That position occurs when all torque transfer shafts 23, and 24, point to their adjacent beam's positive, numbered 1, position, In that pinned position a group of positive and negative numbers can be summed, as shown, per item 39. An equation, per item 40 is again utilized so that the beams can be brought to balance. Note that if a CCW torque of −25, 5 units remained on beam 17, (utilized as the torque summing beam in this case)—that degree of unbalance could only be measured by noting that a positive 25.5 units of CW torque (in this case obtained by sliding the 10 unit weight to a positive 2.55 position) caused all beams to balance.

Most drawings refer to a four beam arrangment, as in FIG. 1. Four beams compose the preferred embodiment. An indicated alternate #1 is the sometimes required five beam arrangment when higher than 3rd degree equation solutions are desired—as illustrated by the five beam schematic representations per FIGS. 4, and 5. This application's computer as shown in the FIGS. 1,3, and 6 drawings, item descriptions, and summary covers the preferred embodiment.

Another alternate #2, would have each beam incorporate 3 parallel weight channels, one each for a 1, 10, and 100 unit weight. Three weight channels per beam as shown in past drawings, describe a more capable, but more costly alternate arrangement. Those expansive alternates would make the computer more powerful, but also more complex, than is felt necessary.

A third altenate arrangement could have the linear connectible device take the form of a linear, horizontal bar, of constant, narrow width and thickness, fixed to the middle of the right, out, side of each beam. From an end view, a channel shaped short lenth of an extrusion, would grip the mating bar, and have a fixed, outward protruding shaft that would be allowed to rotate within a positive number 1 positioned hole in a right hand adjacent beam. This arrangement would seem to have no advantage over the described arrangement herein that includes a torque transfer shaft with a rotatable bearing block end (item 38) that mates and slides within the open groove on the side of left hand adjacent beam. Both arrangements could have a satisfactory amount of flat bearing surfaces to limit wear.

A fourth alternate reverses the arrangement of the torque transfer means by having each beam's torque transfer shaft located on its right side instead of its left side. And, having its linear groove located on its left side instead of its right side.

The torques generated by all beams can also be considered as summed on the right hand beam d, since torques are transferred in both directions from beam to beam. The highest, third degree, coefficient of a third degree equation, can, more logically, be set on the left hand beam, in an arrangement similar to the arrangement in an equation. Coefficients of lower degrees of the unknown, in descending order, can then be set on succesive beams in the right hand direction.

SOME COMMON MULTIPLE DEGREE EQUATIONS

Area of circle of radius r:

$$A = \pi r^2, \text{ or } A - \pi r^2 = 0$$

Surface area of sphere of radius r:

$$A = 4\pi r^2, \text{ or } A - 4\pi r^2 = 0$$

Volume of sphere of radius r:

$$V = 4/3 \pi r^3$$

Height of a fired projectal after time t, against gravitational pull g:

$$H = \tfrac{1}{2} g t^2$$

Centripetal acceleration a, of an object tied at radius r, having a circular velocity v:

$$a = v^2/r$$

Kinetic energy (KE) of a body having mass m, and velocity v:

$$KE = m \, v^2/2$$

Twisting torque (T) on a rod having shear modulus E, length l, and radius R:

$$T = \pi \theta E R^4 / 2l$$

The intensity of radiation on the internal surface of a sphere from a centered point source:

$$I = E/4\pi r^2$$

The force action between two poles having strengths of $m_1$, and $m_2$, in a medium with permeability of u is:

$$F = m_1 m_2 / u r^2$$

The power in watts in a direct current electrical circuit, with a current level of I, and a circuit resistance of R is:

$$W = I^2 R$$

The inductance L, of a coil having length l, permeability u, number of turns N, and cross sectional area A, is:

$$L = 4\pi N^2 A . u 10^{-9}/l$$

The energy W, in Joules, of a magnetic field having an inductance of L henries, and a current of I amperes is:

$$W = L I^2 / 2$$

The energy W, stored on a capacitor with a capacitance of C farads, and a potential difference of V volts is:

$$W = C V^2 / 2$$

The intensity I, of sound, having a wave propagation of V cm, per sec. frequency f, particle displacement r, and medium density d, is:

$$I = 2 \pi^2 V f^2 r^2 d$$

I claim:

1. A mechanical, analog teaching computer for solving equations having multiple as well as single degree unknowns, comprising:
    an assembly of parallel, interconnecting, balancing beams;
    a plurality of axle shafts, each one of said plurality of shafts being pivotably connected to a respective one of said plurality of beams in said assembly and being longitudinally centered with respect to a longitudinal length of said respective balancing beam, each of said axle shafts having an axis about which its respective beam pivots, each said axle shaft axis extending perpendicularly relative to said longitudinal length of said respective beam and allowing a rotational movement of said respective beam, and each said axis being arranged along, and parallel to, one of first and second conceptual centerlines, wherein every other axis, as arranged in said assembly, is included as a member of a first group and the remaining of the axes form the members of a second group, and wherein each said axis which is a member of said first group is co-linear with said first of said conceptual centerlines and with all other members of said first group while each said axis which is a member of said second group is co-linear with said second of said conceptual centerlines and with all other members of said second group, said first conceptual centerline and said second conceptual centerline being in parallel relation to each other;
    a plurality of supporting means for maintaining each of said plurality of said beams at a common distance relative to each of a plurality of stiff, flat strips, and each one of said plurality of supporting means being connected to a respective one of said plurality of axle shafts;

a plurality of stiff, flat strips, each one of said plurality of strips being mounted to a respective one of said supporting means, each one of said plurality of strips being in slidable engagement relative to each adjacent other of said plurality of strips, and wherein every other one of said strips in said assembly is a member of a first set and the other ones of said plurality of strips of said assembly are members of a second set, wherein members of said first set maintain a common axis centerline with each other member of said first set and members of said second set maintain a common axis centerline with each other member of said second set, and wherein said first set is in slidable engagement with said second set;

a plurality of weight retaining channels, at least one of said weight-retaining channels being mounted to a respective one of said plurality of balancing beams, each of said at least one channels being parallel to and coextensive with the direction of the longitudinal length of said respective beam, each one of said plurality of channels having a "0" marking immediately adjacent said the axis of the respective axle so connected to said respective beam axis, and having a plurality of equally-spaced, consecutively-numbered main markings in a linear arrangement along a length of each channel in a single-spaced manner from said "0" marking to a "10" marking adjacent each of a first negatively valued end and a second positively valued end of said channel which is co-linear and opposite said first negatively valued end, and a spacing between each of said main markings being further subdivided by a set of nine equally spaced sub-markings and sub-numbers "1" through "9" in a consecutive order between each of said main markings, each said sub-marking corresponding to a respective one of said sub-numbers with a proximal-most of said nine equally spaced sub-markings being proximate the "0" marking and having as its corresponding sub-number "1" and a distal-most of said nine equally spaced sub-markings being proximate a respective one of said first and second ends of said channel and having as its corresponding sub-number "9", each of said plurality of channels being arranged on said respective beams in said assembly such that all of said first negatively valued ends which are mounted to beams having axle axes which are members of said first group extend in a first common direction and all of said first negatively valued ends which are mounted to beams having axle axes which are members of said second group extend in a second common direction which is parallel to and opposite said first common direction, and each said channel having a means for slidably receiving at least one weight;

a plurality of weights, at least two of said plurality of weights being slidably received in respective ones of said plurality of channels, a first of said at least two of said plurality of weights having a unit weight and a second of said plurality of weights having a weight equal to ten times the weight of said first of said at least two weights, and each of said first and said second of said plurality of weights being separately slidably received in said respective one of said channels along separate conceptual linear directions each of which is parallel to each other of said conceptual linear directions as well as a longitudinal length of said respective channel, said conceptual linear directions further being non-co-linear;

a plurality of linear connecting means, each one of said plurality of linear connecting means being adjacent a first side of each of said plurality of beams, said first side having a face which has a normal direction which is parallel to said first and second conceptual centerlines for mating with a respective torque transfer shaft of an adjacent one of said plurality of beams; and a plurality of torque transfer shafts, each one of said plurality of torque transfer shafts being connected to a respective one of said plurality of beams and extending perpendicularly from said respective beam, and each said one of said torque transfer shafts positively engaging an adjacent one of said plurality of linear connecting means, said adjacent one of said plurality of linear connecting means being located on a beam adjacent said respective beam and slidably and rotatably engaging said torque transfer shaft.

2. The mechanical, analog teaching computer as set forth in claim 1, wherein each of said plurality of connecting means for mating with a respective torque transfer shaft is a linear groove and said respective torque transfer shaft is snugly received within said groove.

3. The mechanical, analog teaching computer as set forth in claim 2, wherein each said respective torque transfer shaft has an outer end which is encompassed by a rotatable bearing block and said rotatable bearing block is snugly received within said groove.

4. The mechanical, analog teaching computer as set forth in claim 3, further including means including a base and a pair of hold down blocks for allowing the slidable engagement between said first set and said second set of strips and for allowing the addition of at least one extra strip with mounted beam.

5. The mechanical, analog teaching computer as in claim 4, wherein the slidable engagement between said first set and said second set of strips allows each said torque transfer pin to point to a series of same numerical numbers, said series of same numerical numbers, during beam unbalance, being a series of non-answers to the multiple degree equation.

6. The mechanical, analog teaching computer as in claim 5, wherein the slidable engagement between said first set and said second set of strips concluding in a balance of beams, causes each said torque transfer pin to point to a same numerical number, said same numerical number being a real number solution to the multiple degree equation.

* * * * *